No. 732,015. PATENTED JUNE 23, 1903.
C. T. STEPHENS.
WHIFFLETREE.
APPLICATION FILED APR. 9, 1903.
NO MODEL.

Witnesses
Cornelius Stephens
C. V. Cilley.

Inventor.
Clayton T. Stephens,
By Ithiel J. Cilley
Attorney.

No. 732,015. Patented June 23, 1903.

UNITED STATES PATENT OFFICE.

CLAYTON THEADOR STEPHENS, OF RENO, MICHIGAN.

WHIFFLETREE.

SPECIFICATION forming part of Letters Patent No. 732,015, dated June 23, 1903.

Application filed April 9, 1903. Serial No. 151,913. (No model.)

*To all whom it may concern:*

Be it known that I, CLAYTON THEADOR STEPHENS, a citizen of the United States, residing at Reno, in the county of Ottawa and State of Michigan, have invented certain new and useful Improvements in Whiffletrees, of which the following is a specification.

My invention relates to improvements in whiffletrees for connecting horses to vehicles; and its object is to provide a whiffletree attachment from which the tugs cannot become detached except by the act of the party having the horse and vehicle in control. I attain these objects by the mechanism illustrated in the accompanying drawings, in which—

Figure 1:
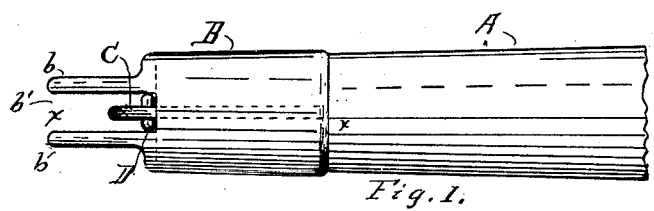
Figure 2:
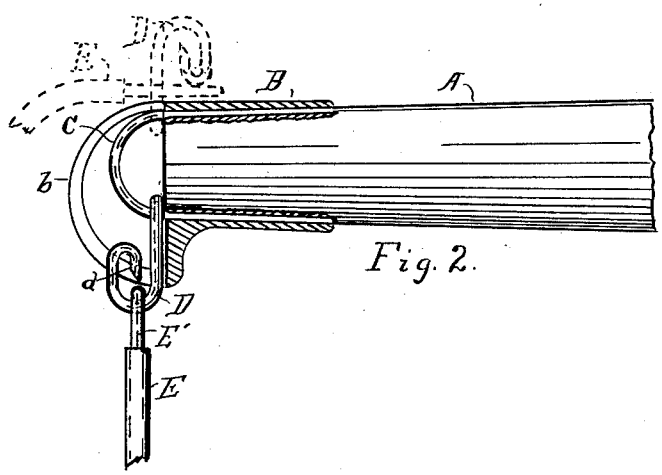

Figure 1 is a back view of a whiffletree with my attachment in place, and Fig. 2 is a plan of the same with my attachment shown in section upon the line X X of Fig. 1.

Similar letters refer to similar parts throughout both views.

A represents the end of a whiffletree. My attachment consists of an annular body or socket B, arranged to receive or be placed upon the end of the whiffletree, as shown, and of two longitudinal projecting arms $b\ b$ some little distance apart to form an opening or slot $b'$ between them for the free manipulation of the hook D, which is secured to the staple C, or of any desired or available form, in such a manner that it may be carried from the position indicated by the solid lines in Fig. 2, where it is so guarded by the end $d$ of the hook D, being held well back between the arms $b\ b$, that the tug-loop $E'$ cannot possibly become or be unhooked from it, to the position of the dotted lines, where the end $d$ of the hook D is carried entirely clear of the arms $b\ b$, and the tug-loop $E'$ may be easily passed between the end $d$ of the hook D and the arms $b\ b$ and attached to or detached from the hook.

It will be readily conceived that the tug cannot possibly become detached from the hook D by reason of the horses backing up or any other act that will slacken the tension of the tugs, as when this happens the whiffletree invariably swings down to the position shown in Fig. 1 and retains the hook in its guarded position. (Shown in Fig. 2.)

It will be noted that the arms $b$ project directly from the surface of the body B on the side where the tug E and the hook D are shown in dotted lines, so that when the hook is in this position it is carried entirely out from between the arms, and the tug-loop $E'$ may be easily attached or detached, while the opposite side projects forward from the body, so that the end $d$ is entirely covered by the arms $b$, as hereinbefore suggested.

The return-bend $d$ in the hook is so formed that if by any chance the hook D and tug E should be thrown far enough toward the position of the dotted lines so that the loop $E'$ might otherwise become disconnected from the hook the loop would naturally drop back of the return-bend, thus averting all danger of its becoming disconnected.

Having thus fully described my invention, what I claim as new, and desire to secure by Letters Patent of the United States, is—

1. In combination with a whiffletree, whiffletree-hooks and the staple at the ends of the whiffletree that secures the hooks to the whiffletree, a guard consisting of a body secured to the end of the whiffletree and having the projecting end bifurcated with one arm each side of the supporting-staple and the hook, one edge of said arms in direct line with the surface of the whiffletree and the other edge offset to cover the inner ends of the hook, substantially as and for the purpose set forth.

2. In combination with a whiffletree, a whiffletree-hook and the staple that secures the hook to the whiffletree, a guard consisting of an annular body forming a ferrule for the end of the whiffletree, and a bifurcated end projecting longitudinally from the end of the whiffletree with one arm each side of the staple and hook, one edge of said arms in direct line with the surface of the whiffletree and the other edge offset and covering the inner end of the hook, substantially as and for the purpose set forth.

3. In combination with a whiffletree, a whiffletree-hook and the staple that secures the hook to the whiffletree, a return-bend in the hook, a guard secured to the end of the whiffletree and having a bifurcated arm projecting longitudinally therefrom each side of the staple and hook, one edge of said arm in line with the surface of the whiffletree and the other edge projecting sidewise beyond the inner end of the hook, substantially as and for the purpose set forth.

Signed at Reno, Michigan, March 17, 1903.

CLAYTON THEADOR STEPHENS.

In presence of—
 AMY BROWN,
 STEWART L. BROWN.